UNITED STATES PATENT OFFICE.

OSCAR NASTVOGEL, OF ELBERFELD, GERMANY, ASSIGNOR TO THE FARBENFABRIKEN OF ELBERFELD COMPANY, OF NEW YORK.

DIPHENYLNAPHTHYLMETHANE DYE.

SPECIFICATION forming part of Letters Patent No. 605,119, dated June 7, 1898.

Application filed November 23, 1897. Serial No. 659,547. (Specimens.)

*To all whom it may concern:*

Be it known that I, OSCAR NASTVOGEL, doctor of philosophy, chemist, (assignor to the FARBENFABRIKEN OF ELBERFELD COMPANY, of New York,) of Elberfeld, Germany, have invented a new and useful Improvement in Diphenylnaphthylmethane Dyes; and I hereby declare the following to be a clear and exact description of my invention.

My invention relates to the production of a new diphenylnaphthylmethane dye by first condensing a tetraälkyldiamidobenzhydrol, such as tetramethyldiamidobenzhydrol, with certain alpha-naphthylaminsulfo-acids of the formula

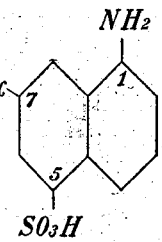

(in which formula $x$ represents either a hydrogen atom or a sulfo group;) secondly, diazotizing the leuco compound thus obtained, which (in case 1.5 naphthylaminmonosulfo-acid is employed) has the formula:

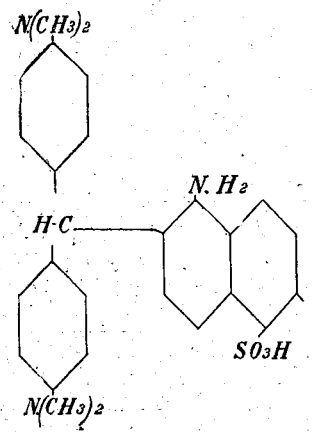

thirdly, converting the resulting diazo compound into a sulfinic-sulfonic acid of the formula:

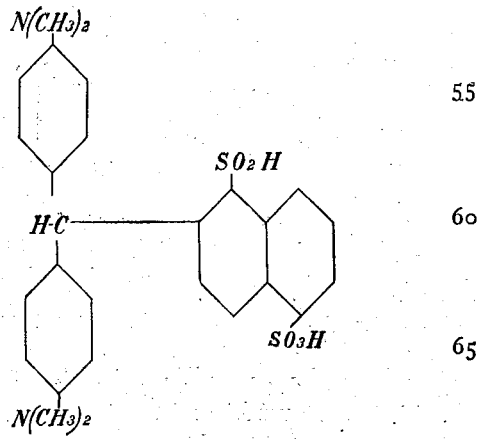

and, finally, transforming the latter into the disulfonic dyestuff, having in the form of the sodium salt the formula:

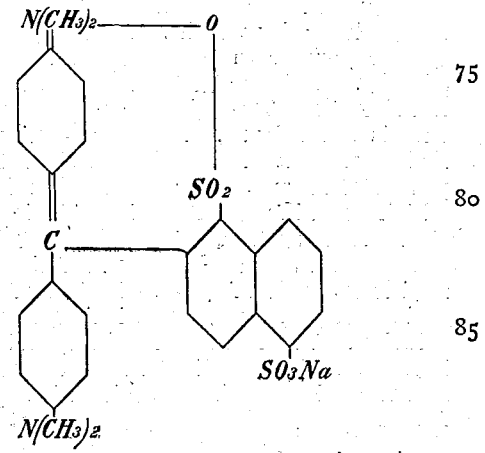

In carrying out my process practically I can proceed as follows: A hot solution of 24.5 kilos, by weight, of the sodium salt of 1.5 naphthylaminsulfo-acid in fifty liters of water is stirred into a liquid prepared by dissolving twenty-seven kilos, by weight, of tetramethyldiamidobenzhydrol in a solution of twenty kilos, by weight, of sulfuric acid (66°

Baumé) in five hundred liters of water. The mixture is heated at about 80° centigrade until the hydrol used is no longer distinguishable and a test portion of the mixture clearly dissolves in sodium-carbonate solution. At this stage the greenish-yellow solution is allowed to cool, the condensation product being thus separated in the form of slightly-colored crystals, which can be completely purified by recrystallization from hot diluted sulfuric acid. According to my researches this condensation product has the following formula, viz:

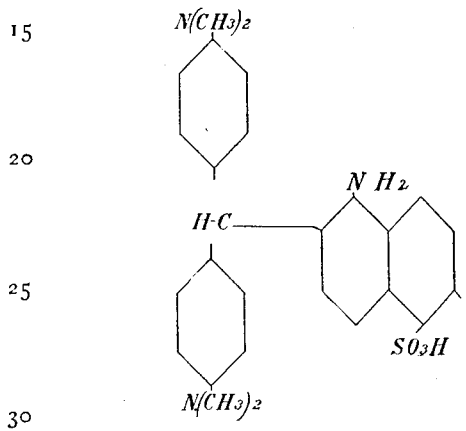

Such a quantity of this product as corresponds with seven kilos, by weight, of sodium nitrite is dissolved in four hundred liters of water and one hundred kilos, by weight, of sulfuric acid, (66° Baumé,) and the icy-cold solution while being strongly stirred is diazotized by means of a solution in water of seven kilos, by weight, of sodium nitrite. Subsequently twenty kilos, by weight, of sulfur dioxid are introduced into the diazo solution, and then fifteen kilos, by weight, of freshly-prepared copper powder in the shape of a paste are added, taking care that the temperature does not rise above 0° centigrade and that the mixture is well stirred. As soon as nitrogen is no longer evolved two hundred kilos of finely-pulverized common salt are added to the mass, which contains the sulfinic-sulfonic acid in the form of crystals. After allowing the mixture to stand for a while the sulfinic-sulfonic acid is separated from the liquid by filtration and subsequent washing with a common-salt solution. The residue remaining on the filter is treated with a sodium-carbonate solution, and the solution thus obtained is separated from the undissolved copper powder by filtration. On acidulating this solution by the addition of a mineral acid the free sulfinic-sulfonic acid is precipitated in the shape of nearly colorless crystals. 52.4 kilos, by weight, of this acid are dissolved in a solution of eight kilos, by weight, of sodium hydroxid in five hundred liters of water, and a sodium-hypochlorite solution containing 7.1 kilos, by weight, of active chlorin is allowed to flow slowly into the said solution, which is well cooled and stirred. Thus the sulfinic group is transformed into the sulfonic group. After neutralizing the solution it is mixed with one hundred kilos, by weight, of a fifty-per-cent. acetic acid and ten kilos, by weight, of sulfuric acid, (66° Baumé,) and one hundred and sixty kilos, by weight, of a lead dioxid paste containing fifteen per cent. of $PbO_2$ are added, keeping the temperature at about 30° centigrade. Finally the mixture is filtered in order to remove the lead sulfate, and the finished dyestuff is precipitated from the filtrate by means of common salt.

When dry and pulverized, the new dyestuff presents a brown powder easily soluble in water with a greenish-blue color; in concentrated hydrochloric acid with a yellow color. By concentrated sulfuric acid it is dissolved with a yellowish color, which turns into green on the addition of a sufficient quantity of ice.

The product is insoluble in a cold strong soda-lye, (35° Baumé;) but when heated with this soda-lye it is partly dissolved with a reddish-violet color under evolution of dimethylamin.

The coloring-matter dyes unmordanted wool in acid-baths clear greenish-blue and even shades, which are fast against the action of alkalies.

If instead of the 1 naphthylamin 5 monosulfo-acid the analogous 1 naphthylamin 5.7 disulfo-acid is employed in my new process, a product is obtained which exhibits very similar chemical and dyeing properties.

Having now described my invention and in what manner the same is to be performed, what I claim as new, and desire to secure by Letters Patent, is—

1. The process for producing a new diphenylnaphthylmethane dye by first condensing tetraalkyldiamidobenzhydrol with a naphthylaminsulfo-acid of the formula

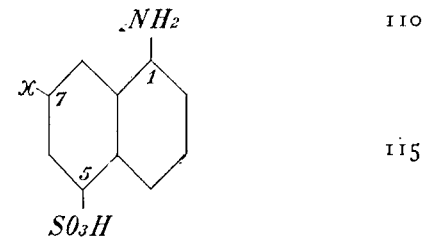

in which formula $x$ represents a hydrogen atom or a sulfo group, secondly diazotizing the resulting leuco compound, thirdly transforming the diazo group of the body thus obtained into the sulfinic group and finally changing the so-produced leuco sulfinic-sulfonic acid into the corresponding dyestuff sulfonic acid by means of oxidizing agents.

2. As a new article of manufacture the new dyestuff obtainable from tetramethyldiamidobenzhydrol having in the form of the sodium salt in case 1.5 naphthylaminsulfo-acid is employed the formula

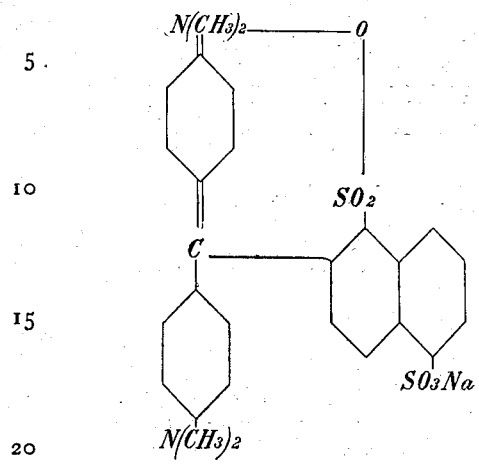

being a brown powder, easily soluble in water with a greenish-blue color, in concentrated hydrochloric acid with a yellow color, in concentrated sulfuric acid with a yellowish color which changes into green on the addition of a sufficient quantity of ice, being partly dissolved with a reddish-violet color under evolution of dimethylamin when heated with a strong soda-lye (35° Baumé) dyeing wool in acid baths clear greenish-blue and even shades fast to alkalies.

In testimony whereof I have signed my name in the presence of two subscribing witnesses.

OSCAR NASTVOGEL.

Witnesses:
R. E. JAHN,
OTTO KÖNIG.